(12) United States Patent
Aoki et al.

(10) Patent No.: US 12,456,764 B2
(45) Date of Patent: Oct. 28, 2025

(54) BATTERY MODULE

(71) Applicant: DENSO CORPORATION, Kariya (JP)

(72) Inventors: Kousuke Aoki, Kariya (JP); Tatsuhiro Numata, Kariya (JP)

(73) Assignee: DENSO CORPORATION, Kariya (JP)

( * ) Notice: Subject to any disclaimer, the term of this patent is extended or adjusted under 35 U.S.C. 154(b) by 741 days.

(21) Appl. No.: 17/849,330

(22) Filed: Jun. 24, 2022

(65) Prior Publication Data

US 2022/0328890 A1    Oct. 13, 2022

Related U.S. Application Data

(63) Continuation of application No. PCT/JP2020/047956, filed on Dec. 22, 2020.

(30) Foreign Application Priority Data

Feb. 20, 2020 (JP) ................. 2020-026954

(51) Int. Cl.
*H01M 10/48* (2006.01)
*H01M 50/296* (2021.01)
*H01M 50/516* (2021.01)

(52) U.S. Cl.
CPC ....... *H01M 10/482* (2013.01); *H01M 50/296* (2021.01); *H01M 50/516* (2021.01)

(58) Field of Classification Search
CPC . H01M 10/482; H01M 50/516; H01M 50/296
See application file for complete search history.

(56) References Cited

U.S. PATENT DOCUMENTS

| | | | | |
|---|---|---|---|---|
| 9,372,237 | B2* | 6/2016 | Choi | H01M 10/425 |
| 2012/0149307 | A1* | 6/2012 | Terada | H02J 50/10 |
| | | | | 455/66.1 |
| 2013/0149578 | A1* | 6/2013 | Uchida | H01M 10/482 |
| | | | | 429/90 |
| 2015/0357685 | A1* | 12/2015 | Iwasawa | G01R 31/371 |
| | | | | 429/90 |
| 2016/0056510 | A1* | 2/2016 | Takeuchi | H01M 10/425 |
| | | | | 429/50 |
| 2020/0064408 | A1 | 2/2020 | Sato | |

FOREIGN PATENT DOCUMENTS

JP    2014507058 A  *  3/2014  .......... H01M 10/486

OTHER PUBLICATIONS

The Decision of JPO to grant a Patent for Application JP2022187479 (Year: 2025).*
JP-2014507058 MT (Year: 2014).*

* cited by examiner

*Primary Examiner* — Alexander Usyatinsky
(74) *Attorney, Agent, or Firm* — Oliff PLC

(57) ABSTRACT

A battery module includes: a plurality of assembled batteries; a plurality of individual detection units configured to individually detect a physical quantity of each of the plurality of assembled batteries; a plurality of individual communication units configured to output a detection result of each of the plurality of individual detection units as wireless signal; a monitoring unit configured to wirelessly communicate with each of the plurality of individual communication units; and an electromagnetic reflection housing having a storage space to store the plurality of assembled batteries, the plurality of individual detection units, the plurality of individual communication units, and the monitoring unit.

12 Claims, 5 Drawing Sheets

BATTERY MODULE

CROSS REFERENCE TO RELATED APPLICATION

The present application is a continuation application of International Patent Application No. PCT/JP2020/047956 filed on Dec. 22, 2020, which designated the U.S. and claims the benefit of priority from Japanese Patent Application No. 2020-026954 filed on Feb. 20, 2020. The entire disclosures of all of the above applications are incorporated herein by reference.

TECHNICAL FIELD

The present disclosure relates to a battery module having a plurality of assembled batteries.

BACKGROUND

A power supply system includes a battery and a battery monitoring system. The battery monitoring system includes battery monitoring devices and a battery ECU. Wireless communication is performed between the battery monitoring devices and the battery ECU.

SUMMARY

According to an aspect of the present disclosure, a battery module includes:

a plurality of assembled batteries;
a plurality of individual detection units configured to individually detect a physical quantity of each of the plurality of assembled batteries;
a plurality of individual communication units configured to output a detection result of each of the plurality of individual detection units as wireless signal;
a monitoring unit configured to wirelessly communicate with each of the plurality of individual communication units; and
an electromagnetic reflection housing having a storage space to store the plurality of assembled batteries, the plurality of individual detection units, the plurality of individual communication units, and the monitoring unit.

DESCRIPTION OF EMBODIMENTS

Figure 1:
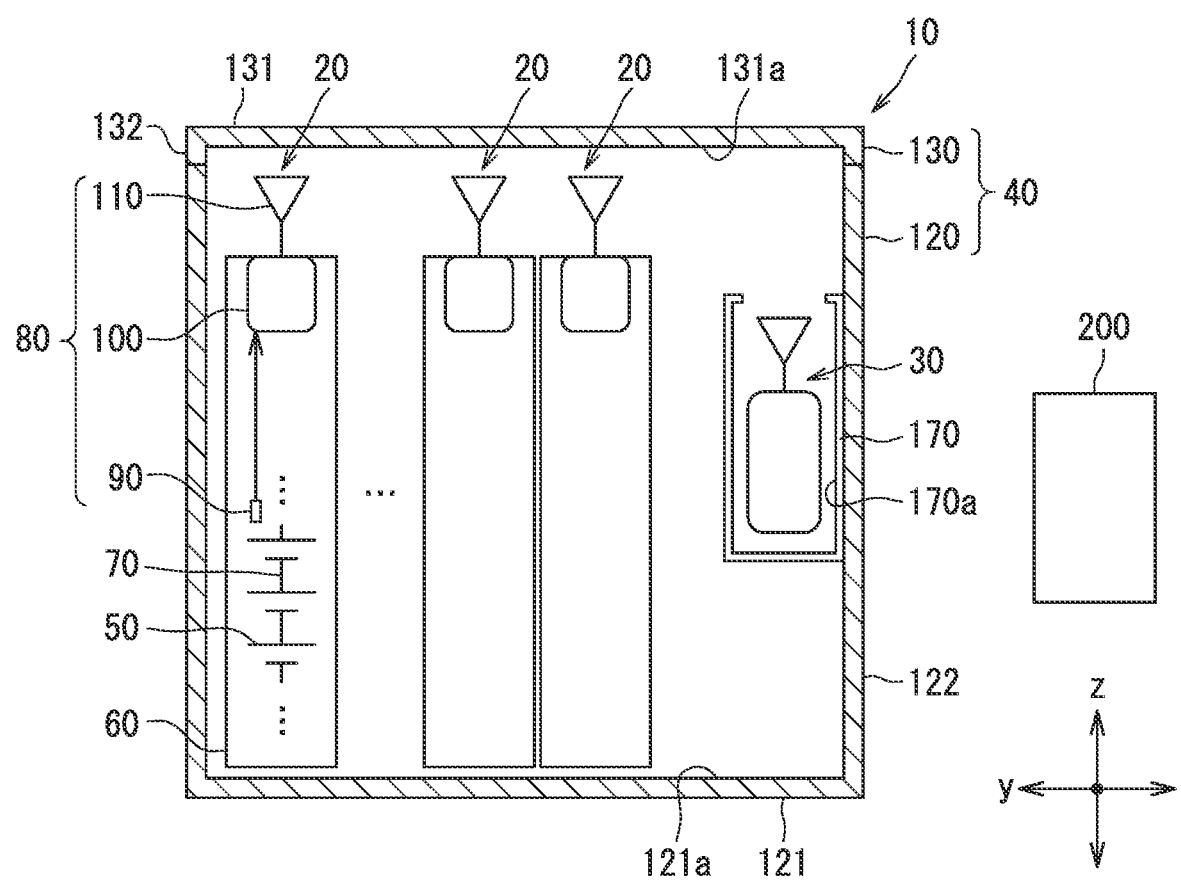
FIG. 1 is a schematic diagram illustrating a battery module and a battery ECU.

To begin with, examples of relevant techniques will be described.

A power supply system includes a battery and a battery monitoring system. The battery monitoring system includes battery monitoring devices and a battery ECU. Wireless communication is performed between the battery monitoring devices and the battery ECU.

In the power supply system, when a wireless signal is output from the battery monitoring devices and the battery ECU into a metal housing, the wireless signal is repeatedly reflected on the inner wall surface of the housing. As a result, if n is an integer of two or more, a high-order electromagnetic wave having a frequency n times the frequency of the wireless signal is generated in the housing. A standing wave is generated inside the housing, in which multiple electromagnetic waves with different frequencies are superposed. Electromagnetic waves are likely to be strengthened in some places and are likely to be weakened in another places in the housing. As a result, wireless communication between the battery monitoring devices and the battery ECU may be hindered.

The present disclosure provides a battery module in which wireless communication is suppressed from being disturbed.

According to one aspect of the present disclosure, a battery module includes: a plurality of assembled batteries; a plurality of individual detection units configured to individually detect a physical quantity of each of the plurality of assembled batteries; a plurality of individual communication units configured to output a detection result of each of the plurality of individual detection units as wireless signal; a monitoring unit configured to wirelessly communicate with each of the plurality of individual communication units; and an electromagnetic reflection housing having a storage space to store the plurality of assembled batteries, the plurality of individual detection units, the plurality of individual communication units, and the monitoring unit. Each of the plurality of assembled batteries has: a plurality of battery cells in which a negative terminal and a positive terminal are arranged with an interval in a width direction on an electrode forming surface of a metal case; a battery case that houses the plurality of the battery cells to be arranged in a length direction intersecting the width direction along the electrode forming surface; a first terminal connection portion that electrically connects the negative terminal of one of the battery cells to the positive terminal of the adjacent battery cell in the length direction; and a second terminal connection portion that electrically connects the positive terminal of one of the battery cells adjacent to each other to the negative terminal of the adjacent battery cell, the second terminal connection portion being separated from the first terminal connection portion in the width direction. The individual communication unit is provided in a waveguide path defined between the first terminal connection portion and the second terminal connection portion in the width direction and defined between the electrode forming surface and a facing surface of the electromagnetic reflection housing facing the electrode forming surface in a height direction orthogonal to the electrode forming surface. A shortest length of the waveguide path in one of the width direction and the height direction is longer than half of a wavelength of the wireless signal and shorter than the wavelength of the wireless signal, and a shortest length of the waveguide path in the other of the width direction and the height direction is shorter than the shortest length of the waveguide path in the one of the width direction and the height direction.

According to another aspect of the present disclosure, a battery module includes:
a plurality of assembled batteries;

a plurality of individual detection units configured to individually detect a physical quantity of each of the plurality of assembled batteries;

a plurality of individual communication units configured to output a detection result of each of the plurality of individual detection units as wireless signal;

a monitoring unit configured to wirelessly communicate with each of the plurality of individual communication units;

an electromagnetic reflection housing having a storage space to store the plurality of assembled batteries, the plurality of individual detection units, the plurality of individual communication units, and the monitoring unit; and a plurality of individual waveguide tubes, each of which has a waveguide path that houses the respective individual communication unit, wherein a shortest separation distance between inner wall surfaces of the waveguide path in a first direction orthogonal to an extension direction of the waveguide path is longer than half of a wavelength of a wireless signal and shorter than the wavelength, and a shortest separation distance between inner wall surfaces of the waveguide path in a second direction orthogonal to each of the extension direction and the first direction is shorter than the shortest separation distance in the first direction.

According to the present disclosure, intrusion of an electromagnetic wave (high-order electromagnetic wave) having a frequency that is an integral multiple of the frequency of a wireless signal transmitted/received between the individual communication unit and the monitoring unit into the waveguide path is suppressed. In addition, the generation of high-order electromagnetic waves in the waveguide path is suppressed.

Therefore, it is possible to suppress the generation of a standing wave in which high-order electromagnetic waves having different frequencies are superposed in the waveguide path. The place where the electromagnetic wave is easily strengthened and the place where the electromagnetic wave is easily weakened are restricted from being generated in the waveguide path. As a result, it is suppressed that the individual communication unit provided in the waveguide path becomes difficult to receive the wireless signal output from the monitoring unit. Accordingly, it is possible to restrict the wireless communication from being disturbed.

The following will describe embodiments for carrying out the present disclosure with reference to the drawings. In each embodiment, parts corresponding to the elements described in the preceding embodiments are denoted by the same reference numerals, and redundant explanation may be omitted. When only a part of a configuration is described in an embodiment, the other preceding embodiments can be applied to the other parts of the configuration.

When, in each embodiment, it is specifically described that combination of parts is possible, the parts can be combined. In a case where any obstacle does not especially occur in combining the parts of the respective embodiments, it is possible to partially combine the embodiments, the embodiment and the modification, or the modifications even when it is not explicitly described that combination is possible.

First Embodiment

A battery module according to this embodiment will be described with reference to FIGS. 1 to 3. The battery module of this embodiment is applied to a vehicle such as an electric vehicle or a plug-in hybrid vehicle.

In the following, the three directions orthogonal to each other are referred to as the x direction, the y direction, and the z direction. The description of "direction" is omitted in the drawings. The x direction corresponds to a width direction. The y direction corresponds to a length direction. The z direction corresponds to a height direction.

<In-Vehicle Battery>

FIG. 1 shows a battery module 10. The battery module 10 constitutes an in-vehicle power supply. The battery module 10 supplies electric power to an electric load of the vehicle. An in-vehicle power supply may be configured by electrically connecting the battery modules 10 in series or in parallel.

The temperature of the battery module 10 is adjusted by air supplied from a fan mounted on the vehicle. Alternatively, the temperature of the battery module 10 is adjusted by cooling liquid circulating in the vehicle. As a result, an excessive change in temperature of the battery module 10 is suppressed.

The battery module 10 can be arranged in, for example, a space under the front seat of the vehicle, a space under the rear seat, a space between the rear seat and the trunk room, and the like.

<Battery Module>

As shown in FIG. 1, the battery module 10 has plural assembled batteries 20, an integrated monitoring unit 30, and a case 40. The assembled batteries 20 and the integrated monitoring unit 30 are housed in the storage space of the case 40.

<Assembled Battery>

Each of the assembled batteries 20 has plural battery cells 50, a battery case 60, a bus bar 70, and an information acquisition unit 80. The battery case 60 houses the battery cells 50. The bus bar 70 electrically connects the battery cells 50. The information acquisition unit 80 acquires the physical quantities of the battery cells 50 and outputs the information to the integrated monitoring unit 30. The information acquisition unit 80 carries out an equalization process described later.

Each of the battery cells 50 is a secondary battery that generates an electromotive voltage by a chemical reaction. As the secondary battery, for example, a lithium ion secondary battery can be adopted.

The battery cell 50 has a power generation element and a metal case for housing the power generation element. As shown in FIGS. 2 and 3, the metal case has a flat shape having a thickness in the y direction. The metal case has a first end surface 50a and a second end surface 50b arranged in the z direction. The metal case has a first main surface 50c and a second main surface 50d arranged in the y direction. The metal case has a first side surface 50e and a second side surface 50f arranged in the x direction. Of the six surfaces of the metal case, the first main surface 50c and the second main surface 50d have a larger area than the other four surfaces.

A negative electrode terminal 51 and a positive electrode terminal 52 are formed on the first end surface 50a of the metal case. The negative electrode terminal 51 and the positive electrode terminal 52 are arranged so as to be separated from each other in the x direction. The negative electrode terminal 51 is located adjacent to the first side surface 50e. The positive electrode terminal 52 is located adjacent to the second side surface 50f. The first end surface 50a corresponds to an electrode forming surface.

<Battery Case>

Figure 2:
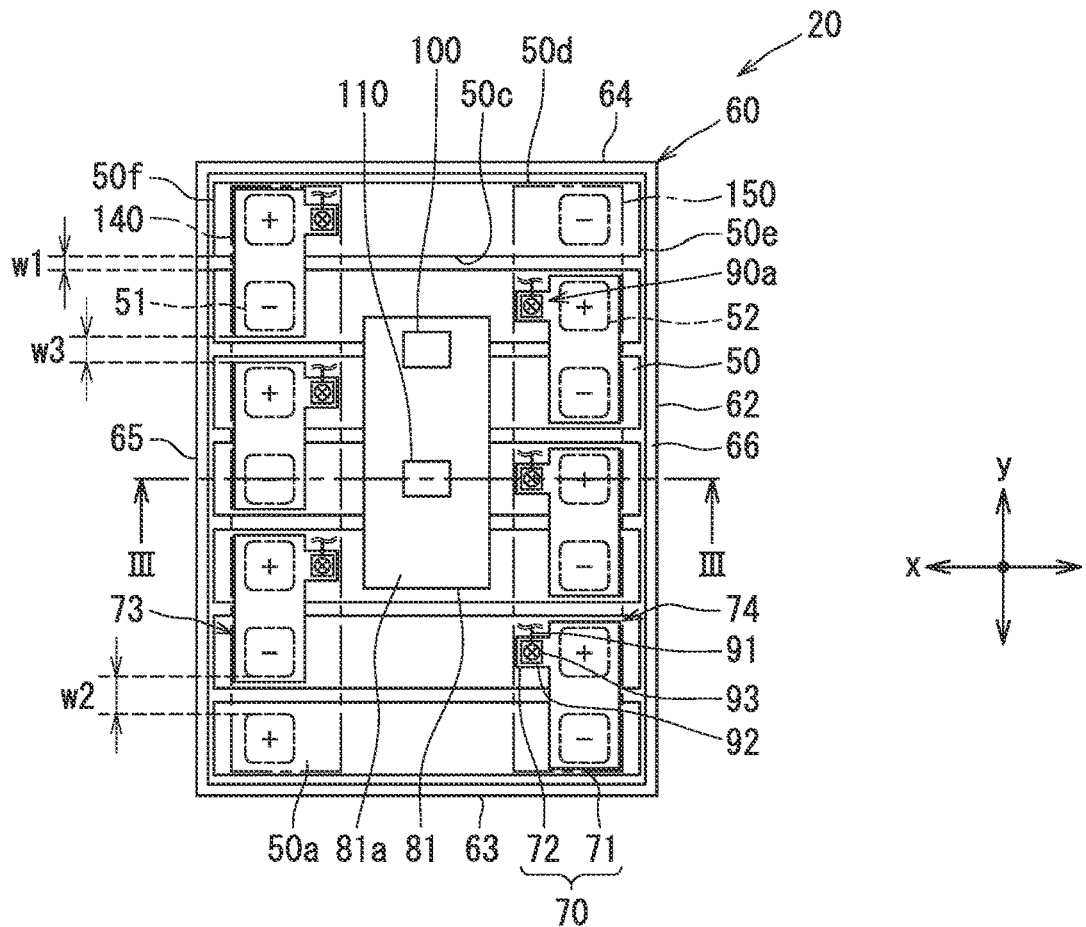
FIG. 2 is a top view showing an assembled battery.
Figure 3:
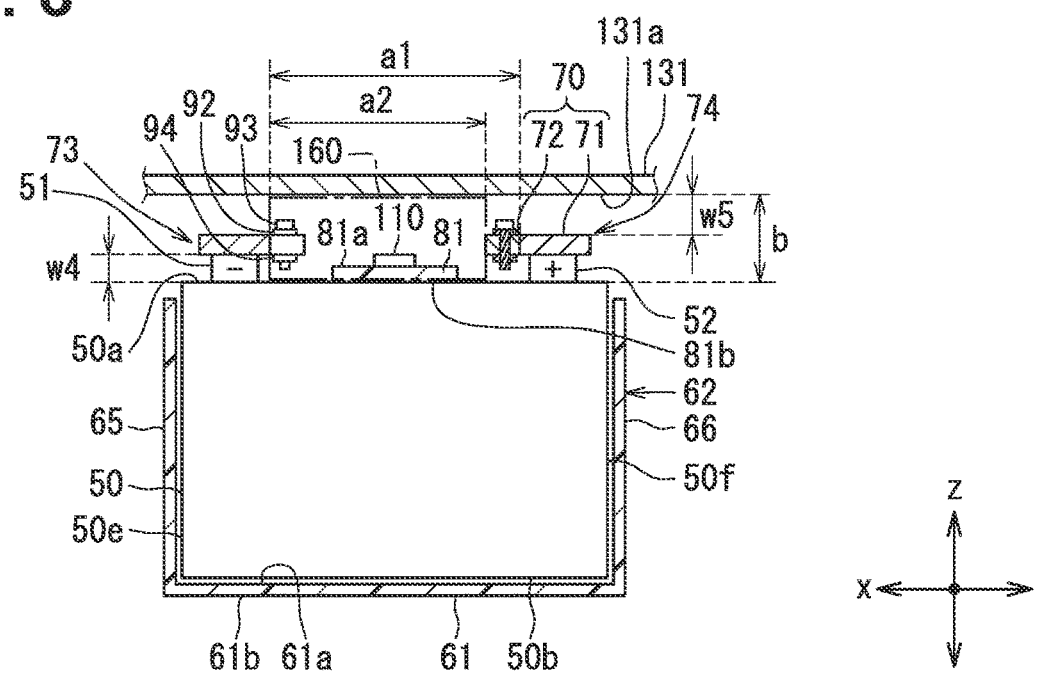
FIG. 3 is a cross-sectional view illustrating a waveguide of a first embodiment.

As shown in FIGS. 2 and 3, the battery case 60 has a support wall 61 and a peripheral wall 62. The support wall 61 and the peripheral wall 62 are integrally connected with each other. Each of the support wall 61 and the peripheral wall 62 is manufactured of an insulating resin material. Note that FIG. 3 shows a cross-sectional shape of the assembled battery 20 taken along a line III-Ill shown in FIG. 2.

The support wall 61 has a flat shape having a thickness in the z direction. The support wall 61 has an inner support surface 61a and an outer support surface 61b facing opposite from each other in the z direction.

The peripheral wall 62 extends upright in the z direction from the inner support surface 61a. The peripheral wall 62 extends along the edge of the inner support surface 61a and forms an annular shape in the circumferential direction around the z direction.

To explain in detail, the peripheral wall 62 has a first end wall 63 and a second end wall 64 arranged opposite from each other in the y direction, and a first connecting wall 65 and a second connecting wall 66 arranged opposite from each other in the x direction. The first end wall 63, the first connecting wall 65, the second end wall 64, and the second connecting wall 66 are connected in this order in the circumferential direction around the z direction. As a result, the peripheral wall 62 forms an annular shape in the circumferential direction around the x direction. The space above the inner support surface 61a is surrounded by the peripheral wall 62. The battery cells 50 are stored in this storage space.

The second end surface 50b of the battery cell 50 is stored in the storage space of the battery case 60. The first end surface 50a of the battery cell 50 is located outside the storage space of the battery case 60. Therefore, the negative electrode terminal 51 and the positive electrode terminal 52 of the battery cell 50 are located outside the storage space of the battery case 60.

The battery cells 50 are arranged in the y direction between the first end wall 63 and the second end wall 64 of the battery case 60. The battery case 60 has a non-illustrated partition wall provided between the two battery cells 50 arranged in the y direction. Due to this partition wall, the first separation interval w1 is defined between two battery cells 50 arranged adjacent to each other in the y direction. The first separation interval w1 is narrower than the thickness of the battery cell 50 in the y direction.

The two battery cells 50 arranged adjacent to each other in the y direction face each other with the first main surfaces 50c or the second main surfaces 50d facing each other. Due to this facing arrangement, the negative electrode terminal 51 of the battery cell 50 and the positive electrode terminal 52 of the adjacent battery cell 50 are arranged in they direction.

The second separation interval w2 is defined between the negative electrode terminal 51 of the battery cell 50 and the positive electrode terminal 52 of the adjacent battery cell in the y direction. The second separation interval w2 is approximately equal to or smaller than the thickness of the battery cell 50 in the y direction.

As shown in FIG. 2, the negative electrode terminals 51 and the positive electrode terminals 52 are alternately arranged in a row along the first connecting wall 65 and along the second connecting wall 66 of the battery case 60. In the following, for the sake of simplicity, the negative electrode terminals 51 and the positive electrode terminals 52 arranged in a row along the first connecting wall 65 is referred to as a first electrode terminal group. The negative electrode terminals 51 and the positive electrode terminals 52 arranged in a row along the second connecting wall 66 is referred to as a second electrode terminal group.

The negative electrode terminal 51 and the positive electrode terminal 52 included in the first electrode terminal group and the second electrode terminal group are electrically connected by the bus bar 70 shown in FIGS. 2 and 3. Thus, the battery cells 50 are electrically connected in series to form one battery stack.

The battery stacks of the assembled battery 20 are electrically connected in series by a non-illustrated wire or the like. A power line is connected to each of the highest potential assembled battery 20 and the lowest potential assembled battery 20. The battery stacks of the assembled battery 20 may be electrically connected in parallel.

<Bus Bar>

The bus bar 70 is made of a conductive metal material such as copper or aluminum. The bus bar 70 includes two terminal conductive portions 71 that are integrally connected so as to be arranged in the y direction. The terminal conductive portion 71 has a flat shape having a thickness in the z direction. The thickness of the terminal conductive portion 71 is determined so that the performance of the battery cell 50 is not changed by increase in the temperature during laser welding between the terminal conductive portion 71 and the electrode terminal of the battery cell 50.

The conductive extension portion 72 extends from one of the two terminal conductive portions 71 of the bus bar 70. The conductive extension portion 72 extends from the terminal conductive portion 71 by separating from the current path between the connection with the negative electrode terminal 51 of the terminal conductive portions 71 and the connection with the positive electrode terminal 52 of the terminal conductive portion 71. Therefore, it is difficult for the current to flow in the conductive extension portion 72. A voltage sensor 90a, which will be described later, is electrically connected to the conductive extension portion 72.

As shown in FIG. 2, the bus bars 70 are arranged with intervals from each other in the y direction. The third separation interval w3 is defined between the two bus bars 70 adjacent to each other in the y direction. The third separation interval w3 is smaller than the second separation interval w2.

<Information Acquisition Unit>

The information acquisition unit 80 includes sensors 90 for detecting the respective physical quantities of the battery cells 50, an individual monitoring unit 100 into which the detection results of the sensors 90 are input, and an individual communication unit 110 for inputting/outputting wireless signals. The sensor 90 is provided on the detection target. Each of the individual monitoring unit 100 and the individual communication unit 110 is mounted on the wiring board 81. As shown in FIG. 2, the wiring board 81 is provided on the first end surfaces 50a of the battery cells 50.

The sensors 90 include a voltage sensor, a temperature sensor, and a current sensor. The voltage sensor detects an output voltage of each of the battery cells 50. The temperature sensor detects a temperature of at least one of the battery cells 50. The current sensor detects a current flowing in common through the battery cells 50 electrically connected in series. The sensor 90 corresponds to an individual detection unit.

FIGS. 2 and 3 illustrate the voltage sensor 90a as a representative of the sensors that detect the different physical quantities. The voltage sensor 90a has a voltage detection wiring 91, a voltage detection terminal 92, a detection screw 93, and a nut 94.

The voltage detection wiring 91 is an insulated wire whose conductor is covered with an insulating coating. The voltage detection terminal 92 is connected to one end of the voltage detection wiring 91. The other end of the voltage detection wiring 91 is electrically connected to the individual monitoring unit 100 via a connector or the like mounted on the wiring board 81. FIG. 2 illustrates only one end side of the voltage detection wiring 91 in order to avoid complication.

Each of the voltage detection terminal 92 and the conductive extension portion 72 has a through hole that opens in the z direction. The voltage detection terminal 92 and the conductive extension portion 72 are arranged to face each other in such a manner that the two through holes communicate with each other in the z direction. A shaft portion of the detection screw 93 is passed through the two through holes, and the nut 94 is fastened to the shaft portion.

The head portion of the detection screw 93 adjacent to shaft portion is in contact with the upper surface of the voltage detection terminal 92, and the nut 94 is in contact with the lower surface of the conductive extension portion 72. The voltage detection terminal 92 and the conductive extension portion 72 are supported between the head portion of the detection screw 93 and the nut 94. As a result, the voltage detection terminals 92 and the conductive extension portions 72 are respectively electrically connected.

The detection results of the sensors 90 are input to the individual monitoring unit 100. The individual monitoring unit 100 generates a monitoring signal to which an identification code is attached to identify which of the assembled batteries 20 outputs the signal, together with the detection results of the sensors 90. This monitoring signal is input to the individual communication unit 110.

The individual communication unit 110 converts the input monitoring signal into a wireless signal. This wireless signal is output from the individual communication unit 110 to the storage space of the case 40. This wireless signal is received by the integrated monitoring unit 30. Wireless communication is performed between the individual communication unit 110 and the integrated monitoring unit 30.

The wireless signal output from each of the individual communication unit 110 and the integrated monitoring unit 30 is a radio wave having a frequency band of 3 kHz to 3 THz. As this wireless signal, an ultra-high frequency wave having a frequency band of 300 MHz to 3 GHz can be adopted.

The frequency and wavelength of the wireless signal output from each of the individual communication unit 110 and the integrated monitoring unit 30 is constant. The frequency (wavelength) of the wireless signal is determined according to the shape of the battery cell 50 and the like. In the following, for the sake of simplicity, the frequency of the wireless signal is referred to as fundamental frequency f. The wavelength of the wireless signal is referred to as fundamental wavelength $\lambda$.

<Integrated Monitoring Unit>

The integrated monitoring unit 30 receives the wireless signal output from each of the assembled batteries 20. The integrated monitoring unit 30 converts this wireless signal into a digital signal. The integrated monitoring unit 30 outputs the digital signal to the battery ECU 200. The integrated monitoring unit 30 corresponds to a monitoring unit.

The battery ECU 200 calculates the SOC of the battery module 10 based on the input digital signal. SOC is an abbreviation for state of charge. The battery ECU 200 determines the charge/discharge of the battery module 10 based on the detected SOC and the information input from other vehicle-mounted ECUs, vehicle-mounted sensors, and the like.

Further, the battery ECU 200 calculates the SOC of each of the battery cells 50 of each of the assembled batteries 20. The battery ECU 200 determines whether to carry out the SOC equalization processing of each of the battery cells 50. The battery ECU 200 outputs an instruction signal to the integrated monitoring unit 30 based on the determination of the equalization process.

The battery ECU includes at least one calculation processing unit (also referred to as a CPU) and at least one memory device (also referred to as a MMR) as a storage medium storing program and data. The battery ECU includes a microcontroller including a computer/processor readable storage medium. The storage medium is a non-transitory tangible storage medium that non-temporally stores a computer/processor readable program. The storage medium may include a semiconductor memory, a magnetic disk, or the like.

The integrated monitoring unit 30 outputs the input instruction signal as a wireless signal to the storage space of the case 40. This instruction signal includes the identification code. Therefore, only the individual monitoring unit 100 corresponding to the identification code included in the wireless signal receives this wireless signal, among the individual monitoring units 100.

The individual monitoring unit 100 includes a switch element for individually charging and discharging each of the battery cells 50. The individual monitoring unit 100 controls open/close of the switch element based on the input instruction signal. As a result, specific battery cells 50, among the battery cells 50, are electrically connected to each other.

A current flows from the battery cell 50 having a relatively high SOC to the battery cell 50 having a low SOC, among the battery cells 50 electrically connected. As a result, the SOCs of the battery cells 50 are equalized.

The SOC of each of the battery cells 50 included in one assembled battery 20 may be calculated by the individual monitoring unit 100 included in the assembled battery 20. The individual monitoring unit 100 may determine whether to carry out the SOC equalization processing for each of the battery cells 50.

<Case>

The case 40 has a housing 120 and a lid 130 fixed to the housing 120 to close an opening of the housing 120.

The housing 120 has a bottom wall 121 and a side wall 122 extended from the bottom wall 121 in an annular shape. The bottom wall 121 has a flat shape having a thickness in the z direction. The bottom wall 121 has an inner bottom surface 121a that intersects the z direction. The side wall 122 is extended upright in the z direction from the inner bottom surface 121a. The side wall 122 forms an annular shape in the circumferential direction around the z direction. The opening is defined by the distal end of the side wall 122.

The lid 130 has a top wall 131 and an edge wall 132 protruding from the top wall 131 in an annular shape. The top wall 131 has a flat shape having a thickness in the z direction. The top wall 131 has an inner top surface 131a that intersects the z direction. The edge wall 132 is extended from the inner top surface 131a in the z direction.

The lid 130 is provided on the housing 120 in such a manner that the inner top surface 131a of the top wall 131 and the inner bottom surface 121a of the bottom wall 121 are arranged with an interval between each other in the z direction. The tip end of the edge wall 132 and the tip end of the bottom wall 121 are connected to each other, so as to form the storage space of the case 40.

The housing 120 has a hole (not shown) for communicating the storage space composed of the housing 120 and the lid 130 with a space outside the storage space (external space). The hole is used for ventilation of the case 40, for taking out a power line, for taking out a signal line, and the like.

<Wireless Communication>

As described above, wireless communication is performed between the information acquisition unit 80 of each of the assembled batteries 20 and one integrated monitoring unit 30 in the storage space of the case 40. In order to restrict the battery module 10 from becoming a source of electromagnetic noise, it is necessary to restrict the wireless signal used in this wireless communication from leaking out of the storage space of the case 40. On the contrary, in order to suppress the interference of this wireless communication, it is necessary to suppress the invasion of electromagnetic noise into the storage space of the case 40.

In order to solve the issues, each of the housing 120 and the lid 130 is able to reflect electromagnetic waves. The case 40 including the housing 120 and the lid 130 corresponds to an electromagnetic reflection housing. In order to have the ability to reflect such electromagnetic waves, the housing 120 and the lid 130 are provided with materials shown below as an example.

For example, the housing 120 and the lid 130 are provided with a conductive material such as metal. The housing 120 and the lid 130 include a resin material and a conductive material that covers the surface thereof. The housing 120 and the lid 130 include a resin material and a conductive material embedded therein. The housing 120 and the lid 130 are provided with carbon fibers.

<Standing Wave>

Wireless signals are output from each of the individual communication unit 110 and the integrated monitoring unit 30 in the storage space composed of the housing 120 and the lid 130 having the ability to reflect electromagnetic waves in this way. This wireless signal repeats reflection on the inner surfaces of the storage space formed by the housing 120 and the lid 130.

By repeating the reflection, plural high-order electromagnetic waves having a frequency that is an integer multiple of the frequency of the wireless signal (fundamental frequency f) are generated in the storage space. The high-order electromagnetic waves having different frequencies are superposed in the storage space. As a result, a standing wave is generated in the storage space, such that electromagnetic waves are easily strengthened at some places and are easily weakened at another places in the storage space. As a result, it may be difficult to receive the wireless signal in the storage space. The integer multiple means twice or more.

<Waveguide Path and Waveguide Tube>

In order to solve the issue, the waveguide path 160 is configured for each of the assembled batteries 20 housed in the case 40. The individual communication unit 110 is provided in the waveguide path 160. The battery module 10 has a waveguide tube 170 for housing the integrated monitoring unit 30. FIG. 3 shows the waveguide path 160 as single chain line.

<Waveguide Path>

For example, as shown in FIG. 3, the assembled battery 20 is housed in the storage space of the case 40 in such a manner that the first end surface 50*a* of each of the battery cells 50 is located adjacent to the lid 130.

For such an arrangement configuration, the first end surface 50*a* of each of the battery cells 50 of the assembled battery 20 is arranged to oppose the inner top surface 131*a* of the top wall 131 of the lid 130 in the z direction. Further, the bus bar 70 connected to the electrode terminal of each of the battery cells 50 and the head portion of the detection screw 93 of the voltage sensor 90*a* connected to the bus bar 70 are arranged to face the inner top surface 131*a* in the z direction.

As described above, the first electrode terminal group is formed by arranging the negative electrode terminals 51 and the positive electrode terminals 52 in a row along the first connecting wall 65. The bus bar 70 is connected to the negative electrode terminal 51 and the positive electrode terminal 52 included in the first electrode terminal group. The conductive portion of the voltage sensor 90*a* is connected to each of the bus bars 70. Further, although not shown in FIG. 3, the voltage detection wiring 91 including the conducting wire is provided on the bus bars 70. The bus bar 70 that connects the negative electrode terminal 51 and the positive electrode terminal 52 included in the first electrode terminal group corresponds to a first terminal connection portion. In the following, this bus bar 70 will be referred to as a first bus bar 73, if necessary.

Similarly, the second electrode terminal group is formed by arranging the negative electrode terminals 51 and the positive electrode terminals 52 in a row along the second connecting wall 66. The bus bar 70 is connected to the negative electrode terminal 51 and the positive electrode terminal 52 included in the second electrode terminal group. The conductive portion of the voltage sensor 90*a* is connected to each of the bus bars 70. Although not shown in FIG. 3, the voltage detection wiring 91 including the conducting wire is provided on the bus bars 70. The bus bar 70 that connects the negative electrode terminal 51 and the positive electrode terminal 52 included in the second electrode terminal group corresponds to a second terminal connection portion. In the following, this bus bar 70 will be referred to as a second bus bar 74, if necessary.

As shown above, many metal members are provided along the first connecting wall 65 and the second connecting wall 66 on the first end surface 50*a* of each of the battery cells 50 included in the assembled battery 20. In the following, a first metal wall 140 represents a wall pseudo-configured by many metal members provided along the first connecting wall 65, and a second metal wall 150 represents a wall pseudo-configured by many metal members provided along the second connecting wall 66.

In FIG. 2, the first metal wall 140 and the second metal wall 150 are schematically shown by broken lines. The first metal wall 140 includes the first bus bar 73. The second metal wall 150 includes the second bus bar 74.

The waveguide path 160 is configured between the first metal wall 140 and the second metal wall 150 separated from each other in the x direction. The shape of the waveguide path 160 is defined between the first metal wall 140 and the second metal wall 150 in the x direction, and is defined between the first end surface 50*a* of each of the battery cells 50 and the inner top surface 131*a* of the top wall 131 in the z direction. A region of the inner top surface 131*a* facing the first end surface 50*a* corresponds to a facing surface.

The battery cells 50 are arranged in the y direction as shown in FIG. 2. Therefore, the waveguide path 160 has a shape extending in the y direction. The waveguide path 160 has a length in the x direction longer than the length in the z direction in a plane orthogonal to the y direction.

The distance a1 between the terminal conductive portion 71 of the first bus bar 73 and the terminal conductive portion 71 of the second bus bar 74 in the x direction is longer than half of the fundamental wavelength A and shorter than the same magnification of the fundamental wavelength A. Further, the distance a2 between the terminal conductive portion 71 of one of the first bus bar 73 and the second bus bar 74 and the conductive extension portion 72 of the other in the x direction is longer than half of the fundamental wavelength A, and is shorter than the fundamental wavelength A. The distance a2 corresponds to the shortest length of the waveguide path 160 in the x direction. As shown in FIG. 3, the waveguide path 160 has the length a2 in the x direction in the cross section taken along a line III-Ill shown in FIG. 2.

The distance b between the first end surface 50a and the inner top surface 131a in the z direction is shorter than the distance a1 and is shorter than the distance a2. The distance b corresponds to the shortest length of the waveguide path 160 in the z direction.

Due to this configuration, it is difficult for high-order electromagnetic wave having a frequency that is an integral multiple of the fundamental frequency f to enter the waveguide path 160. Further, in the waveguide path 160, the generation of such high-order electromagnetic waves is suppressed.

As shown in FIG. 2, there is the first separation interval w1 between the two battery cells 50 arranged adjacent to each other in the y direction. There is the second separation interval w2 between the negative electrode terminal 51 of the battery cell 50 and the positive electrode terminal 52 of the adjacent battery cell 50 in the y direction. There is the third separation interval w3 between the two bus bars 70 adjacent to each other in the y direction.

Further, as shown in FIG. 3, there is the fourth separation interval w4 between the electrode terminal of the battery cell 50 and the bus bar 70. There is the fifth separation interval w5 between the bus bar 70 included in each of the first metal wall 140 and the second metal wall 150 and the inner top surface 131a of the top wall 131. There is also a gap between the conductive members included in each of the first metal wall 140 and the second metal wall 150.

The above-described intervals correspond to a hole formed in the waveguide path 160. The longest length of the intervals is shorter than half of the fundamental wavelength A. The interval between the bus bar 70 and the top wall 131 is larger than the other intervals of the above-described intervals. The fifth separation interval w5 between the bus bar 70 and the top wall 131 corresponds to a first longest separation distance and a second longest separation distance.

Strictly speaking, as shown in FIG. 2, there is a gap between two bus bars 70 adjacent to each other in the y direction. The length of the gap in the z direction is a separation interval between the first end surface 50a of the battery cell 50 and the inner top surface 131a of the top wall 131. Therefore, the length of the gap in the z direction is longer than that of the other gaps. However, the voltage detection wiring 91 or the like including the conducting wire is provided in a space above between the two bus bars 70. As a result, this gap is divided in the z direction. The length of this divided gap in the z direction is shorter than half of the fundamental wavelength A.

<Waveguide Tube>

As shown in FIG. 1, the integrated monitoring unit 30 is housed in the hollow of the waveguide tube 170. The partition surface 170a that defines the hollow has a property of reflecting electromagnetic waves. The opening of the waveguide tube 170 allows the wireless signal to enter the hollow of the waveguide tube 170 and to output the wireless signal from the hollow of the waveguide tube 170 to the outside. The hollow of the waveguide tube 170 corresponds to a common waveguide path.

This opening has a substantially rectangular parallelepiped shape. The longitudinal length of the opening is longer than half of the fundamental wavelength A and shorter than the same magnification of the fundamental wavelength A. The lateral length of the opening is shorter than the longitudinal length. Therefore, the higher-order electromagnetic waves are suppressed from entering the waveguide tube 170.

An opening direction is defined to pass through the opening of the waveguide tube 170 perpendicularly to the opening, and an opening plane is defined to be perpendicular to the opening direction. The shortest separation distance between the partition surfaces 170a in a first plane direction along the opening plane is longer than half of the fundamental wavelength A and is shorter than the fundamental wavelength A. The shortest separation distance between the partition surfaces 170a in a second plane direction along the opening plane and orthogonal to the first plane direction is shorter than the shortest separation distance in the first plane direction. Due to this configuration, the high-order electromagnetic waves are suppressed from being generated in the hollow of the waveguide tube 170. The waveguide tube 170 extends in the opening direction. The first plane direction corresponds to a third direction. The second plane direction corresponds to a fourth direction.

<Advantages>

As described above, the individual communication unit 110 is provided in the waveguide path 160 whose length in the x direction is longer than half of the fundamental wavelength $\lambda$ and is shorter than the same magnification of the fundamental wavelength $\lambda$, and whose length in the z direction is shorter than the length in the x direction.

As a result, the high-order electromagnetic wave having a frequency that is an integral multiple of the fundamental frequency f is suppressed from entering the waveguide path 160. At the same time, the generation of such high-order electromagnetic waves in the waveguide path 160 is suppressed. The generation of standing waves in the waveguide path 160 due to the overlap of high-order electromagnetic waves can be suppressed. The waveguide path 160 is suppressed from having a place where the electromagnetic wave is easily strengthened and a place where the electromagnetic wave is easily weakened. Therefore, the individual communication unit 110 can receive the wireless signal. Interference in the wireless communication is suppressed.

The waveguide path 160 is composed of the first metal wall 140 and the second metal wall 150 separated from each other in the x direction, and the battery cell 50 and the top wall 131 separated from each other in the z direction. Thus, the waveguide path 160 is composed of the battery cells 50, the first metal wall 140 and the second metal wall 150 electrically connected to the battery cells 50, and the case 40 for housing them. Therefore, the increase in the number of components is suppressed.

The longest length of the hole (gap) formed in the waveguide path 160 is shorter than half of the fundamental wavelength $\lambda$. Therefore, high-order electromagnetic waves can be restricted from entering the waveguide path 160 through the gap.

The integrated monitoring unit 30 is housed in the hollow of the waveguide tube 170 having an opening. The opening has the longitudinal length in the longitudinal direction that is longer than half of the fundamental wavelength $\lambda$ and shorter than the same magnification of the fundamental wavelength λ. The opening has the lateral length in the lateral direction that is shorter than the longitudinal length in the longitudinal direction. Further, the length of the hollow of the waveguide tube 170 in the first plane direction along the opening plane is longer than half of the fundamental wavelength λ and shorter than the same magnification of the fundamental wavelength λ. The length of the hollow of the waveguide tube 170 in the second plane direction is shorter than that in the first plane direction.

As a result, high-order electromagnetic waves are suppressed from entering the waveguide tube 170. At the same time, it is suppressed that high-order electromagnetic waves are generated inside the waveguide tube 170. Therefore, it is suppressed that the integrated monitoring unit 30 becomes difficult to receive the wireless signal.

Accordingly, it is possible to restrict the individual communication unit 110 and the integrated monitoring unit 30 from becoming difficult to receive the wireless signal. Therefore, it is possible to restrict the wireless communication between the individual communication unit 110 and the integrated monitoring unit 30 from being hindered.

Second Embodiment

Figure 4:
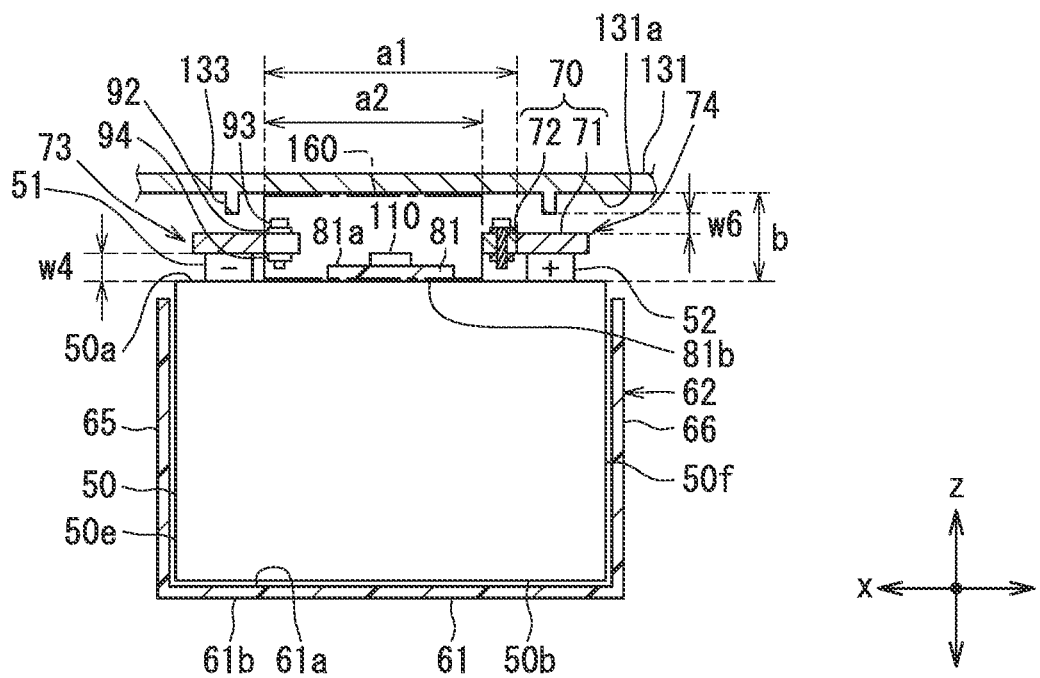
FIG. 4 is a cross-sectional view illustrating a waveguide of a second embodiment.

In the first embodiment, for example, as shown in FIG. 3, the inner top surface 131a of the top wall 131 is flat. In the present embodiment, as shown in FIG. 4, a part of the inner top surface 131a of the top wall 131 projects toward the battery cell 50.

More specifically, the top wall 131 has a protrusion 133 that locally protrudes in the z direction from the inner top surface 131a. The protrusion 133 extends continuously in the y direction.

The top wall 131 has two protrusions 133 per the assembled battery 20. One of the two protrusions 133 faces the first metal wall 140 with an interval in the z direction. The other of the two protrusions 133 faces the second metal wall 150 with an interval in the z direction.

Due to this configuration, each of the separation interval between the top wall 131 and the first metal wall 140 and the separation interval between the top wall 131 and the second metal wall 150 is the sixth separation interval w6 shorter than the fifth separation interval w5. As a result, the gap formed in the waveguide path 160 is reduced. Thus, even if the separation distance between the assembled battery 20 and the lid 130 in the z direction fluctuates, for example, due to vibration, the gap formed in the waveguide path 160 is restricted from increasing, such that high-order electromagnetic waves can be restricted from entering the waveguide path 160.

Further, each of the battery module 10 according to the present embodiment and the battery module 10 according to each of the following embodiments has the same components as the battery module 10 described in the first embodiment. Therefore, the battery module 10 according to this embodiment and each of the following embodiments has the same effect as the battery module 10 described in the first embodiment.

Third Embodiment

Figure 5:
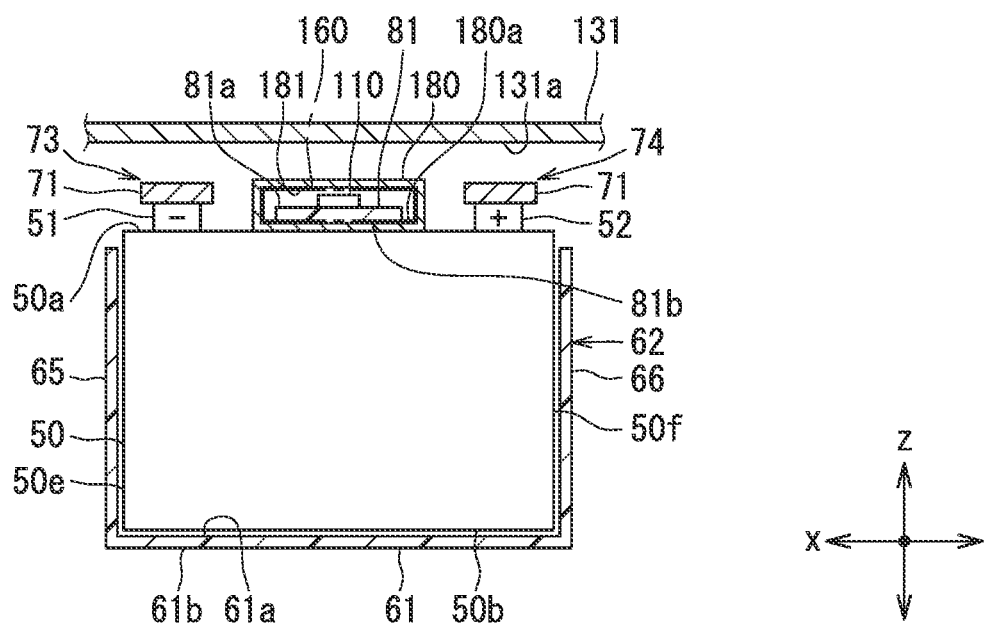
FIG. 5 is a cross-sectional view illustrating a waveguide of a third embodiment.
Figure 6:
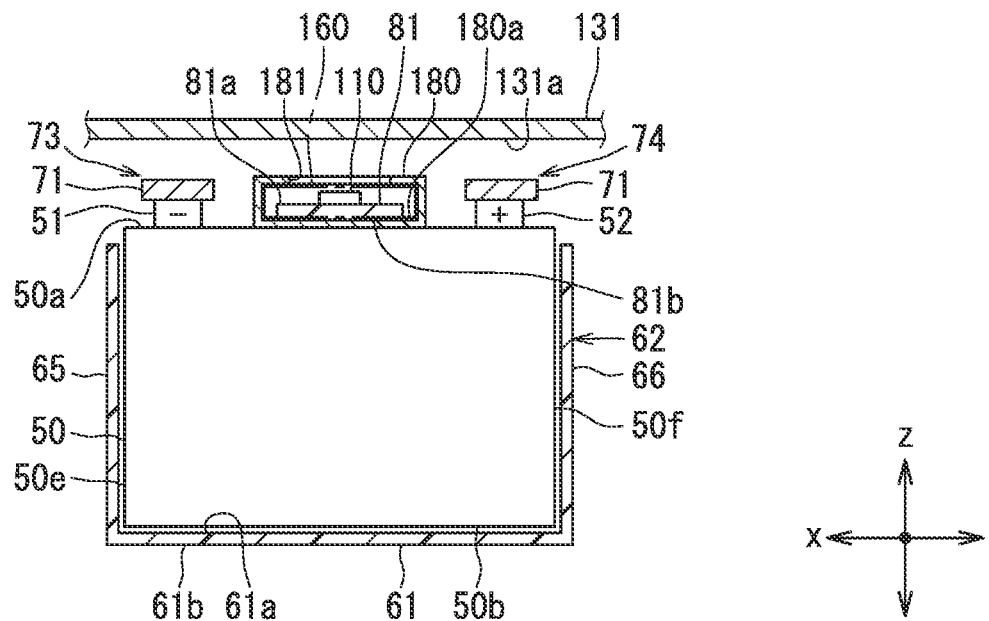
FIG. 6 is a cross-sectional view illustrating a waveguide of the third embodiment.

In each of the first embodiment and the second embodiment, the waveguide path 160 is defined by the battery cells 50, the first metal wall 140 and the second metal wall 150 electrically connected to the battery cells 50, and the case 40 for storing the battery cells 50, the first metal wall 140 and the second metal wall 150. In the present embodiment, as shown in FIGS. 5 and 6, for example, the battery module 10 has an individual waveguide tube 180 in which the individual communication unit 110 is housed in the hollow.

The inner wall surface 180a that partitions the hollow of the individual waveguide tube 180 is able to reflect electromagnetic waves. The hollow of the individual waveguide tube 180 functions as the waveguide path 160.

The shortest separation distance between the inner wall surfaces 180a in the first direction along a plane orthogonal to the extension direction of the individual waveguide tube 180 is longer than half of the fundamental wavelength λ and shorter than the fundamental wavelength λ. The shortest separation distance between the inner wall surfaces 180a in the second direction orthogonal to the first direction along this plane is shorter than the shortest distance between the inner wall surfaces 180a in the first direction.

The individual waveguide tube 180 has an opening 181 that communicates the hollow and the outside thereof. The opening 181 of the individual waveguide tube 180 shown in FIG. 5 is open in the y direction. The opening 181 of the individual waveguide tube 180 shown in FIG. 6 is open in the z direction.

The planar shape of the opening 181 is a rectangular shape. The length of the opening 181 in the longitudinal direction is longer than half of the fundamental wavelength λ and shorter than the fundamental wavelength λ. The length of the opening 181 in the lateral direction is shorter than the length in the longitudinal direction.

Due to such a configuration, it is not necessary to determine the frequency band of the wireless signal according to the shape of the battery cell 50 and the case 40 of the assembled battery 20, the arrangement thereof, and the like. Conversely, it is not necessary to determine the shape of the battery cell 50 and the case 40, the arrangement thereof, and the like according to the frequency band of the wireless signal. Therefore, it is suppressed that the design of the assembled battery 20 becomes difficult.

The individual waveguide tube 180 may have a hole that communicates the hollow and the outside. The longest length of the hole is shorter than half of the fundamental wavelength λ. As the individual waveguide tube 180, a wire mesh having an opening and a hole having the above conditions can also be adopted. This makes it possible to reduce the weight.

Fourth Embodiment

In the third embodiment, the hollow of the individual waveguide tube 180 functions as the waveguide path 160. In the present embodiment, the individual waveguide tube 180 and the conductive member 82 of the wiring board 81 function as the waveguide path 160.

Figure 7:
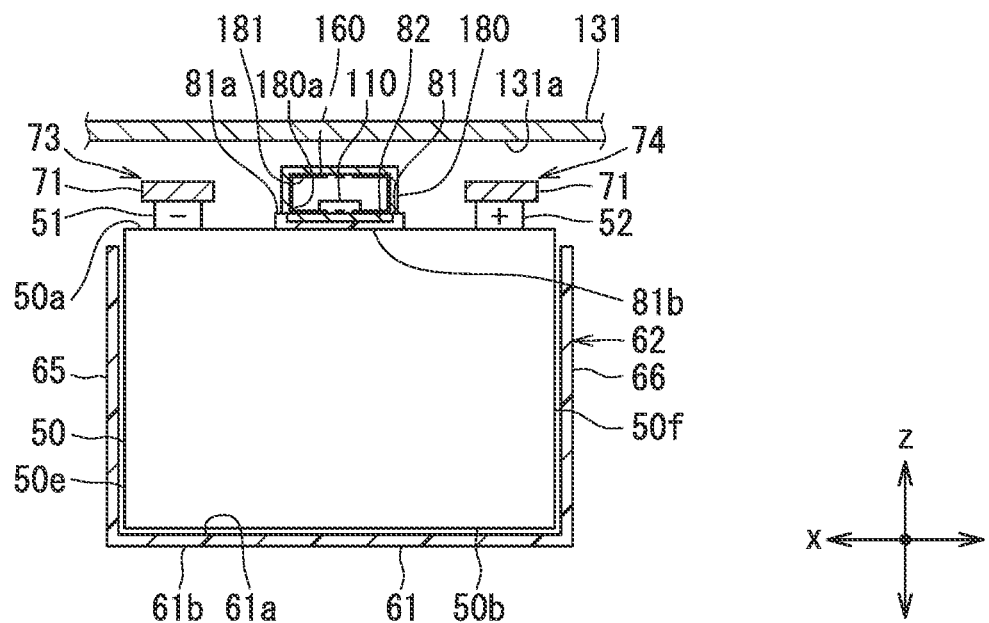
FIG. 7 is a cross-sectional view illustrating a waveguide of a fourth embodiment.

The individual waveguide tube 180 shown in FIG. 7 is provided on the wiring board 81 so as to cover the mounting surface 81a of the wiring board 81 on which the individual communication unit 110 is arranged. The conductive member 82 is provided in a region of the mounting surface 81a that is aligned with the individual waveguide tube 180 in the z direction.

With this configuration, the individual communication unit 110 is provided inside the individual waveguide tube 180. At the same time, the opening of the individual waveguide tube 180 in the z direction is closed by the wiring board 81. As a result, the waveguide path 160 is configured by the individual waveguide tube 180 and the conductive member 82.

The length of the waveguide path 160 in the x direction is longer than half of the fundamental wavelength λ and shorter than the fundamental wavelength λ. The length of the waveguide path 160 in the z direction is shorter than that in the x direction.

The conductive member 82 may be provided on the back surface 81b of the wiring board 81 opposite to the mounting surface 81a. Further, the conductive member 82 may not be provided on the wiring board 81. In this modification, the waveguide path 160 is composed of the individual waveguide tube 180 and metal cases of battery cells 50.

First Modification

Figure 8:
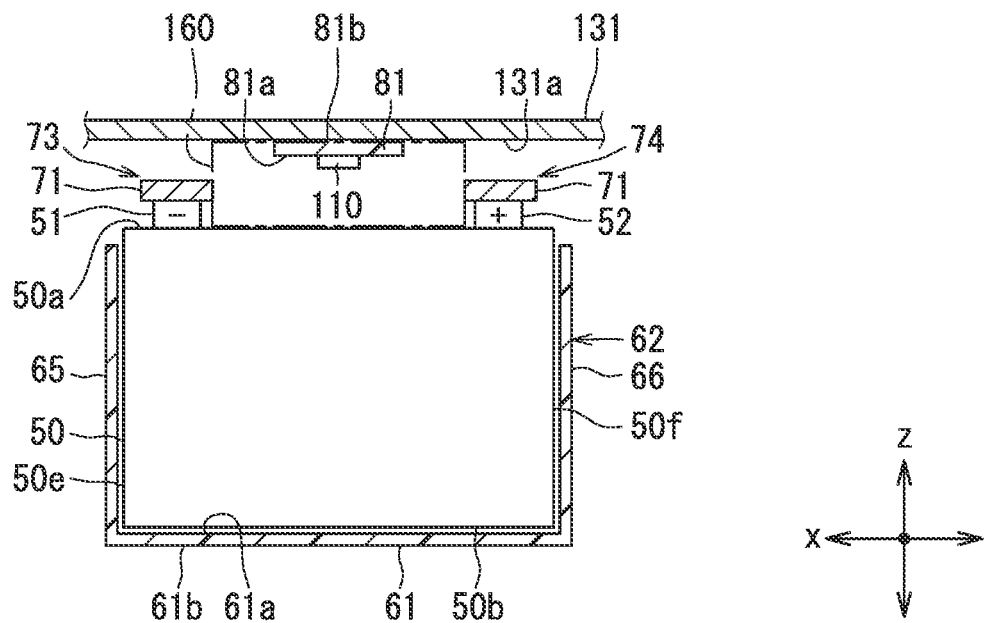
FIG. 8 is a cross-sectional view illustrating a modification of the battery module.
Figure 9:
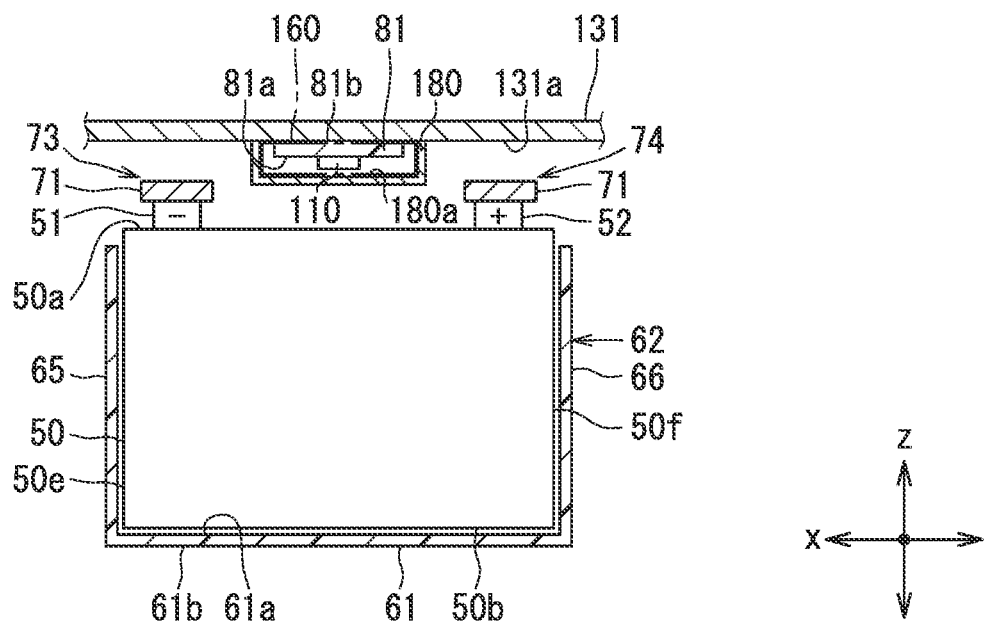
FIG. 9 is a cross-sectional view illustrating a modification of the battery module.

In each of the embodiments, the wiring board 81 on which the individual communication unit 110 is mounted is provided on the first end surface 50a of the battery cells 50. However, as shown in FIGS. 8 and 9, for example, the wiring board 81 may be provided on the inner top surface 131a of the top wall 131. In particular, as shown in FIG. 9, the individual waveguide tube 180 described in the fourth embodiment is provided on the top wall 131 in a manner of surrounding the wiring board 81. Although not shown, the individual waveguide tube 180 described in the third embodiment may be provided on the top wall 131.

Second Modification

In each of the embodiments, the wiring board 81, on which the individual communication unit 110 is mounted, is provided in the waveguide path 160. However, if the individual communication unit 110 is provided in the waveguide path 160, the wiring board 81 may not be provided in the waveguide path 160. The individual monitoring unit 100 may not be provided in the waveguide path 160.

Third Modification

In the first embodiment, the length of the waveguide path 160 in the x direction is longer than that in the z direction. However, the length of the waveguide path 160 in the x direction may be shorter than that in the z direction. The length of the waveguide path 160 in the z direction is longer than half of the fundamental wavelength λ and shorter than the fundamental wavelength λ. Such a modification can be appropriately adopted depending on, for example, the shape of the battery cell 50 included in the assembled battery 20 and the frequency band of the wireless signal to be adopted.

Fourth Modification

In each of the embodiments, the individual communication unit 110 is provided between the battery cell 50 and the top wall 131. However, when the battery module 10 has the individual waveguide tube 180 and the individual communication unit 110 is housed in the hollow of the individual waveguide tube 180, the location of the individual communication unit 110 is not limited. For example, the individual waveguide tube 180 that houses the individual communication unit 110 may be provided in the battery case 60.

While the present disclosure has been described in accordance with the embodiment, it is understood that the present disclosure is not limited to such embodiments or structures. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A battery module comprising:
a plurality of assembled batteries each of which having
a plurality of battery cells having an electrode forming surface of a metal case along which a negative electrode terminal and a positive electrode terminal are arranged with an interval in a width direction,
a battery case that houses the plurality of the battery cells to be arranged in a length direction intersecting the width direction along the electrode forming surface,
a first terminal connection portion that electrically connects the negative electrode terminal of one of the battery cells adjacent to each other to the positive electrode terminal of the adjacent battery cell in the length direction, and
a second terminal connection portion that electrically connects the positive electrode terminal of one of the battery cells adjacent to each other to the negative electrode terminal of the adjacent battery cell in the length direction, the second terminal connection portion being separated from the first terminal connection portion in the width direction;
a plurality of individual detection units configured to individually detect a physical quantity of each of the plurality of assembled batteries;
a plurality of individual communication units configured to output a detection result of each of the plurality of individual detection units as a wireless signal;
a monitoring unit configured to wirelessly communicate with each of the plurality of individual communication units; and
an electromagnetic reflection housing having a storage space to store the plurality of assembled batteries, the plurality of individual detection units, the plurality of individual communication units, and the monitoring unit, wherein
the individual communication unit is provided in a waveguide path defined between the first terminal connection portion and the second terminal connection portion in the width direction and defined between the electrode forming surface and a facing surface of the electromagnetic reflection housing that faces the electrode forming surface in a height direction orthogonal to the electrode forming surface.

2. The battery module according to claim 1, wherein
a shortest length of the waveguide path in one of the width direction and the height direction is longer than half of a wavelength of the wireless signal and shorter than the wavelength of the wireless signal, and a shortest length of the waveguide path in the other of the width direction and the height direction is shorter than the shortest length of the waveguide path in the one of the width direction and the height direction.

3. The battery module according to claim 2, wherein
the shortest length of the waveguide path in the width direction is longer than half of the wavelength and shorter than the wavelength, and the shortest length of the waveguide path in the height direction is shorter than the shortest length of the waveguide path in the width direction, and
each of a first longest separation distance between the first terminal connection portion and the facing surface and a second longest separation distance between the second terminal connection portion and the facing surface is shorter than half of the wavelength.

4. The battery module according to claim 3, wherein
a portion of the facing surface facing the first terminal connection portion and the second terminal connection portion in the height direction is located adjacent to the battery cell in the height direction than the other of the facing surface.

5. The battery module according to claim 3, wherein
the individual communication unit is located adjacent to the facing surface in waveguide path in the height direction.

6. The battery module according to claim 3, wherein
the individual communication unit is arranged on a wiring board, and the wiring board is arranged in the waveguide path between the first terminal connection portion and the second terminal connection portion, and the electrode forming surface in the height direction.

7. The battery module according to claim 2, further comprising:
a waveguide tube having a common waveguide path that houses the monitoring unit, wherein
a shortest separation distance between partition surfaces that define the common waveguide path in a third direction orthogonal to an extending direction of the common waveguide path is longer than half of the wavelength and shorter than the wavelength, and a shortest separation distance between partition surfaces in a fourth direction orthogonal to each of the extending direction and the third direction is shorter than the shortest separation distance in the fourth direction.

8. The battery module according to claim 7, wherein
the waveguide tube is located in contact with the electromagnetic reflection housing.

9. The battery module according to claim 1, wherein
the individual communication unit and the monitoring unit are located at positions different from each other in the height direction.

10. The battery module according to claim 1, wherein
the plurality of individual communication units are arranged in the length direction.

11. The battery module according to claim 1, wherein
the individual communication unit is located at a position different from the negative electrode terminal and the positive electrode terminal in the width direction.

12. A battery module comprising:
a plurality of assembled batteries;
a plurality of individual detection units configured to individually detect a physical quantity of each of the plurality of assembled batteries;
a plurality of individual communication units configured to output a detection result of each of the plurality of individual detection units as a wireless signal;
a monitoring unit configured to wirelessly communicate with each of the plurality of individual communication units;
an electromagnetic reflection housing having a storage space to store the plurality of assembled batteries, the plurality of individual detection units, the plurality of individual communication units, and the monitoring unit; and
a plurality of individual waveguide tubes, each of which includes a waveguide path that houses a respective individual communication unit, wherein
a shortest separation distance between inner wall surfaces that define the waveguide path in a first direction orthogonal to an extension direction of the waveguide path is longer than half of a wavelength of the wireless signal and shorter than the wavelength, and a shortest separation distance between inner wall surfaces in a second direction orthogonal to each of the extension direction and the first direction is shorter than the shortest separation distance in the first direction.

* * * * *